United States Patent
Yamaguchi et al.

(10) Patent No.: US 8,911,909 B2
(45) Date of Patent: Dec. 16, 2014

(54) FUEL LEAKAGE PREVENTING STRUCTURE AND BIOFUEL CELL

(75) Inventors: Daisuke Yamaguchi, Kanagawa (JP); Tsunetoshi Samukawa, Kanagawa (JP); Shuji Fujita, Tokyo (JP); Hiroki Mita, Kanagawa (JP); Takaaki Nakagawa, Kanagawa (JP); Yuichi Tokita, Kanagawa (JP)

(73) Assignee: Sony Corporation, Tokyo (JP)

( * ) Notice: Subject to any disclaimer, the term of this patent is extended or adjusted under 35 U.S.C. 154(b) by 50 days.

(21) Appl. No.: 13/699,061

(22) PCT Filed: Apr. 25, 2011

(86) PCT No.: PCT/JP2011/060565
§ 371 (c)(1),
(2), (4) Date: Jan. 23, 2013

(87) PCT Pub. No.: WO2011/148767
PCT Pub. Date: Dec. 1, 2011

(65) Prior Publication Data
US 2013/0130130 A1    May 23, 2013

(30) Foreign Application Priority Data

May 28, 2010   (JP) ................................ P2010-122258

(51) Int. Cl.
*H01M 8/16*   (2006.01)
*H01M 8/04*   (2006.01)
*H01M 8/24*   (2006.01)

(52) U.S. Cl.
CPC ............ *H01M 8/04201* (2013.01); *H01M 8/16* (2013.01); *H01M 8/04082* (2013.01); *Y02E 60/527* (2013.01); *H01M 8/2455* (2013.01)
USPC .......................................... 429/401; 429/400

(58) Field of Classification Search
CPC .............. H01M 8/16; H01M 8/04201; H01M 8/04082; Y02E 60/527
USPC .......................................................... 429/401
See application file for complete search history.

(56) References Cited

U.S. PATENT DOCUMENTS

2007/0259217 A1* 11/2007 Logan .............................. 429/2
2011/0269029 A1* 11/2011 Gellett et al. .................. 429/401

FOREIGN PATENT DOCUMENTS

| JP | 05-007174 | 9/1994 |
|---|---|---|
| JP | 2005-276682 | 10/2005 |
| JP | 2008-530767 A | 8/2008 |
| JP | 2009-048848 | 3/2009 |
| JP | 2009-048858 | 3/2009 |
| JP | 2009-140646 | 6/2009 |
| WO | 2005057703 A1 | 6/2005 |
| WO | 2010007883 A1 | 1/2010 |

* cited by examiner

*Primary Examiner* — Gary Harris
(74) *Attorney, Agent, or Firm* — Sony Corporation

(57) ABSTRACT

The valve control unit of a fuel leakage preventing structure of the present invention includes first and second electrodes. The first electrode is attached to a first member that is movable. When a pressing force is applied to the first member to move, the first and second electrodes are brought into contact with each other, to cause conduction. The first and second electrodes are connected to a control device, and the control device opens a control valve when the first and second electrodes are put into a conducting state. As the control valve is opened and closed by a pressing force in this manner, a fuel solution can be easily supplied.

10 Claims, 7 Drawing Sheets

FUEL LEAKAGE PREVENTING STRUCTURE AND BIOFUEL CELL

TECHNICAL FIELD

The present invention relates to a fuel cell that uses an oxidoreductase. More particularly, the present invention relates to a technique for supplying fuel to a battery cell unit of a fuel cell.

BACKGROUND ART

A biofuel cell that has an oxidoreductase immobilized as a catalyst on at least one electrode of an anode and a cathode can efficiently extract electrons from fuel such as glucose or ethanol, which cannot be used as a general industrial catalyst. Accordingly, biofuel cells are drawing attention as next-generation fuel cells with a large capacity and a high level of safety.

FIG. 7A is a diagram showing a reaction scheme of the anode of a biofuel cell. FIG. 7B is a diagram showing a reaction scheme of the cathode of the biofuel cell. As shown in FIGS. 7A and 7B, in a biofuel cell using glucose as fuel, an oxidation reaction of glucose progresses at the anode, and a reduction reaction of oxygen ($O_2$) in the atmosphere progresses at the cathode. At the anode, electrons are transferred in the following order: glucose, glucose dehydrogenase, nicotinamide adenine dinucleotide ($NAD^+$), diaphorase, the electron mediator, and the electrode (carbon).

In this manner, a biofuel cell can use a carbohydrate, such as glucose, as fuel. Accordingly, commercially available beverages and the like can be used as fuel, and apparatuses that can use beverages have been suggested (see Patent Documents 1 and 2, for example).

CITATION LIST

Patent Documents

Patent Document 1: Japanese Patent Application Laid-Open No. 2009-48858
Patent Document 2: Japanese Patent Application Laid-Open No. 2009-140646

SUMMARY OF THE INVENTION

Problems to be Solved by the Invention

However, the above-mentioned conventional techniques have the following problems. In the conventional techniques, the level of safety is high when a beverage is used as the fuel solution. Therefore, there are many cases where liquid leakage during the supply and liquid leakage caused by falling are ignored (see the above-mentioned Patent Documents 1 and 2). As a result, fuel leakage preventing structures are not attached to biofuel cells, and in most cases, the fuel solutions in the biofuel cells are exposed to the atmosphere.

When a fuel solution is exposed to the atmosphere, water evaporates from the biofuel cell, and foreign matter (including microorganisms and insects) enter the biofuel cell. Water evaporation causes an increase in the concentration of the fuel solution in the biofuel cell, and the speed of supply of the fuel (sugar) to the electrode surface then becomes lower. Foreign matter causes degradation of the fuel solution. In either case of water evaporation and foreign matter contamination, the power generation efficiency becomes lower.

Also, due to fuel solution spilling or leakage, the fuel solution adheres to clothes, floors, furniture, or the like, resulting in smudges and stickiness. Particularly, a fuel solution leaking from a fuel cell contains not only fuel but also a fuel oxide (a reaction product), a mediator, a supporting electrolyte, an enzyme, and the like. Therefore, attention is required to prevent liquid leakage.

In view of this, the principal object of the present invention is to provide a fuel leakage preventing structure that is capable of readily supplying fuel from a beverage container or the like to a biofuel cell.

Solutions to Problems

A fuel leakage preventing structure according to the present invention includes: a control valve; and a valve control unit that electrically controls opening and closing of the control valve. In the fuel leakage preventing structure, the control valve is attached to one or both of a fuel supply inlet through which fuel is introduced into a battery cell unit of a biofuel cell, and a fuel supply path connected to the fuel supply inlet. The valve control unit opens and closes the control valve, depending on conduction that is caused by a pressing force. Accordingly, the control valve can be easily opened and closed.

The valve control unit can include first and second electrodes. In this case, the first electrode may be attached to a first member that can be moved by a pressing force. When the pressing force is applied to the first member, the first member is moved, and the first and second electrodes are brought into contact with each other, to cause the conduction.

The second electrode may be attached to a second member. In this case, a pushing member may be provided between the first and second members, so that a pushing force is applied to the first member to move away from the second member.

A fuel supply unit that is the path of the fuel solution may be formed in the valve control unit, and one end of the fuel supply unit may serve as the attachment opening for a container containing the fuel solution. In this case, the first member is located below the attachment opening, and the second member is located on a side of the first member. Of the surfaces of the first member, the surface facing the attachment opening is preferably tilted. The tilted surface is preferably closer to the attachment opening at a portion closer to the second member, and is preferably farther from the attachment opening at a portion farther from the second member.

The valve control unit may include a primary storage unit in which the fuel solution is stored. In this case, the first member is inserted into the primary storage unit, and the second electrode is placed at a location in the primary storage unit, the location facing the first electrode. With this arrangement, the first member can be moved in such a direction that the first and second electrodes move closer to each other, and in such a direction that the first and second electrodes move away from each other.

A fuel introducing portion that is the path of the fuel solution may be formed in the first member.

Further, the present invention provides a biofuel cell that includes the fuel leakage preventing structure and a battery cell unit having electrodes with enzymes existing on surfaces thereof.

Effects of the Invention

According to the present invention, a fuel solution can be easily supplied to a biofuel cell, without being spilled.

MODES FOR CARRYING OUT THE INVENTION

A fuel leakage preventing structure of the present invention is fixed to or detachably attached to a battery cell unit of a biofuel cell, and supplies a fuel solution to the biofuel cell.

The following is a detailed description of embodiments for carrying out the present invention, with reference to the accompanying drawings. It should be noted that the present invention is not limited to the embodiments described below. Explanation will be made in the following order.

1a. First Embodiment
  (Example of a fuel leakage preventing structure having a first member to be pressed down by a container)
1b. Modification of the First Embodiment
2a. Second Embodiment
  (Example of a fuel leakage preventing structure having the first member to be pressed down by other means)
2b. Modification of the Second Embodiment <1a. First Embodiment>
[Overall Structure]

Figure 1A:
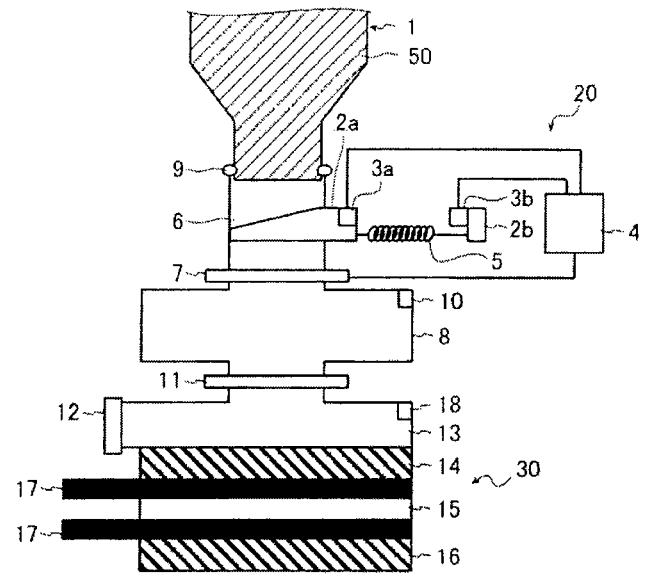
FIG. 1A is a cross-sectional view schematically showing a situation where a container is attached to a fuel leakage preventing structure according to a first embodiment of the present invention.
Figure 1B:
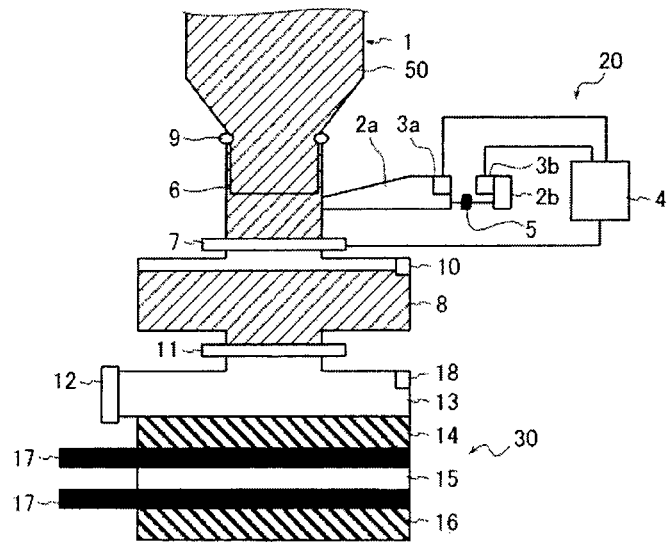
FIG. 1B is a cross-sectional view schematically showing a situation where a fuel solution has been supplied from the container into a primary storage unit.
Figure 2:
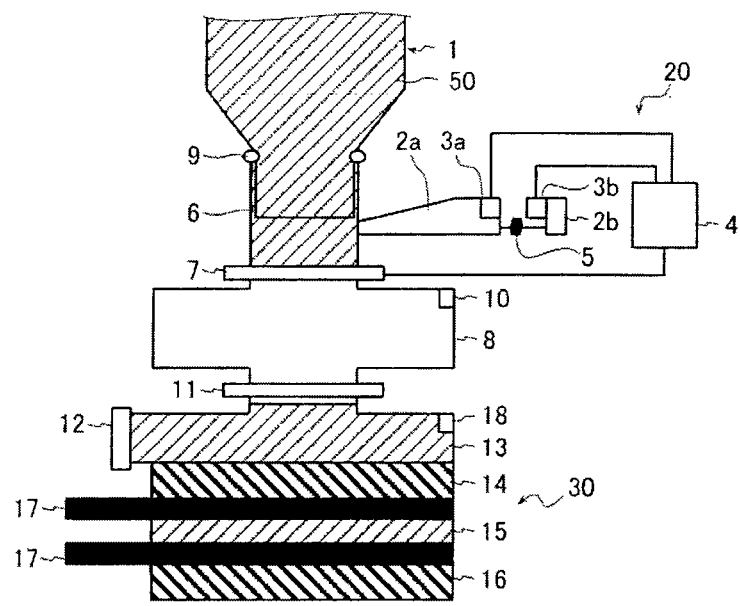
FIG. 2 is a cross-sectional view schematically showing a situation where the fuel solution has been supplied into a secondary storage unit in the fuel leakage preventing structure according to the first embodiment of the present invention.

FIGS. 1A, 1B, and 2 are cross-sectional views schematically showing a biofuel cell having a fuel leakage preventing structure of a first embodiment attached to a battery cell unit 30 thereof. The fuel leakage preventing structure of this embodiment includes a control valve 7, and a valve control unit 20 that controls the control valve 7.

[Control Valve 7]

The control valve 7 is not particularly limited, as long as it is a valve for liquid. It is possible to use a wide variety of generally-used valves such as a gate valve, a glove valve, a ball valve, a butterfly valve, or a diaphragm valve.

The control valve 7 may be attached directly to a fuel supply inlet for supplying fuel to the battery cell unit 30 of the biofuel cell, or may be attached to a fuel supply path (such as a pipe or a storage unit) connected to the fuel supply inlet. Here, a primary storage unit 8 that can store a fuel solution 50 is provided, and the control valve 7 is attached to the primary storage unit 8.

[Valve Control Unit 20]

The valve control unit 20 is not particularly limited, as long as it opens and closes the control valve 7, depending on a pressing force. An example of such a valve control unit is described below in detail.

The valve control unit 20 of this embodiment includes a fuel supply unit 6 serving as a path of the fuel solution 50, a first member 2a attached to the fuel supply unit 6, and a second member 2b located on a side of the fuel supply unit 6.

The fuel supply unit 6 is not particularly limited, as long as it can serve as a path of the fuel solution 50, and may have a cylindrical shape, for example. The fuel supply unit 6 may be attached directly to the battery cell unit 30 of the biofuel cell, but one end of the fuel supply unit 6 is attached to the primary storage unit 8 in this case.

The control valve 7 separates the primary storage unit 8 and the fuel supply unit 6 from each other. When the control valve 7 is closed, the fuel supply unit 6 is disconnected from the primary storage unit 8. When the control valve 7 is opened, the fuel supply unit 6 is connected to the primary storage unit 8.

The end portion of the fuel supply unit 6 on the opposite side from the primary storage unit 8 is open, and serves as an attachment opening to which a container 1 such as a beverage bottle is attached. The structure of the attachment opening is not particularly limited, but a sealing member such as an O-ring 9 for preventing liquid leakage may be used. In this case, the outer wall surface of the opening of the container 1 is in close contact with the liquid leakage preventing O-ring 9, so that the container 1 is secured to the fuel supply unit 6, and leakage of the fuel solution 50 is prevented.

The first member 2a is located between the attachment opening of the fuel supply unit 6 and the gate valve 7. The first member 2a is not particularly limited, as long as it is a movable member. For example, the first member 2a is a member that can move in a transverse direction (a direction that crosses the fuel supply unit 6 serving as a path of the solution).

The second member 2b is placed on the opposite side of the first member 2a from the fuel supply unit 6. A pushing member 5 formed of a spring or an elastic material (such as rubber) is provided between the first and second members 2a and 2b. While the first member 2a is movable, the second member 2b is fixed. The pushing member 5 applies a pushing force to the first member 2a in the direction toward the fuel supply unit 6.

Where the later described pressing force is not applied to the first member 2a, the first member 2a is pushed toward the fuel supply unit 6 by the pushing force.

In this embodiment, the size and shape of the container 1 to be attached to the fuel leakage preventing structure are determined beforehand, and the attachment opening and the liquid leakage preventing O-ring 9 are designed to have sizes and shapes that correspond to the container 1. The first member 2a is positioned at a location corresponding to the container 1. When the opening portion of the container 1 according to this embodiment is inserted into the attachment opening, the top end of the opening portion of the container 1 reaches the first member 2a, and the surface of the first member 2a is pressed down by the container 1.

The surface of the first member 2a facing the attachment opening is tilted, forming a tilted surface. The perpendicular of the tilted surface does not extend in the inserting direction (the pressing direction) of the container 1, and deviates from the pressing direction. The height of the tilted surface is greater at a location closer to the second member 2b (or closer to the attachment opening), and is smaller at a location farther from the second member 2b (or farther from the attachment opening).

The container 1 is further pushed in, and a greater force than the pushing force of the pushing member 5 is applied to the first member 2a, so that the first member 2a is pushed toward the second member 2b. As the first member 2a is moved, the top end of the opening portion of the container 1 moves downward, sliding along the tilted surface of the first member 2a. The first member 2a is pushed even closer to the second member 2b.

Electrodes 3a and 3b (first and second electrodes) are formed on the surfaces of the first and second members 2a and 2b facing each other. The second electrode 3b is located on a side of the first member 2a, so as to face the first electrode 3a.

While a pressing force is not applied, the first member 2a is pushed toward the fuel supply unit 6 by the pushing force, and is separated from the second member 2b so that the first and second electrodes 3a and 3b are not in contact with each other and are in a non-conducting state. When the first member 2a is moved toward the second member 2b by a pressing force, the first and second electrodes 3a and 3b are brought into contact with each other, and are put into a conducting state.

The first and second electrodes 3a and 3b, and the control valve 7 are connected to a control device 4. The control device 4 detects a conducting state between the first and second electrodes 3a and 3b. The control device 4 closes the control valve 7 at the time of non-conduction, and opens the control valve 7 at the time of conduction. That is, the conducting state varies depending on the pressing force generated from the container 1, and the control valve 7 is opened and closed.

The control valve 7 may be opened and closed, depending not only on the pressing force but also on a signal from a liquid volume sensor, a flow rate sensor, or the like. For example, a sensor 10 that detects a liquid volume is provided in the primary storage unit 8, and the sensor 10 is connected to the control device 4.

The sensor 10 transmits a signal indicating the liquid volume in the primary storage unit 8 to the control device 4. In accordance with the signal, the control device 4 opens and closes the control valve 7. For example, when the liquid volume in the primary storage unit 8 reaches a predetermined maximum liquid volume, the control device 4 closes the control valve 7 even if the first and second electrodes 3a and 3b are in a conducting state. In this manner, overflows of the fuel solution 50 are prevented.

If the liquid volume in the primary storage unit 8 is less than a predetermined minimum volume, and the first and second electrodes 3a and 3b are in a conducting state, the control device 4 opens the control valve 7. In this manner, the primary storage unit 8 is replenished with the fuel solution 50 when appropriate.

The installation locations and the number of sensors 10 are not particularly limited, and a sensor may be attached to a storage unit other than the primary storage unit 8. For example, a secondary storage unit 13 may be further provided between the battery cell unit 30 and the primary storage unit 8, and a sensor 18 may be provided in the secondary storage unit 13.

Like the sensor 10 of the primary storage unit 8, the sensor 18 of the secondary storage unit 13 is connected to the control device 4, and can open and close a valve, depending on the liquid volume. The valve to be opened and closed depending on a detection signal from the sensor 18 of the secondary storage unit 13 may be the above-described control valve 7 or may be some other valve. For example, another control valve (a sub control valve 11) may be provided between the primary storage unit 8 and the secondary storage unit 13, and the sub control valve 11 can be opened and closed.

When a waste liquid of the fuel solution 50 is discharged from the battery cell unit 30, the waste liquid may be discharged through the attachment opening of the fuel supply unit 6. In this case, however, the fuel supply unit 6 might be contaminated and, when another container 1 is attached thereto, that container 1 might be contaminated. Therefore, it is preferable to prepare a valve (a waste liquid discharge valve) that is specially designed for discharging a waste liquid. The installation location of the waste liquid discharge valve 12 is not particularly limited, and the waste liquid discharge valve 12 can be installed on one or both of the secondary storage unit 13 and the primary storage unit 8, for example.

[Battery Cell Unit 30]

The battery cell unit 30 to which the fuel leakage preventing structure of the present invention is not particularly limited, and the following is a description of an exemplary structure of the battery cell unit 30.

The battery cell unit 30 can have a structure in which an anode 14 and a cathode 16 are positioned to face each other via a protonic conductor 15. At this point, the anode 14 may be an anode that has an oxidoreductase immobilized onto the surface of an electrode formed of a conductive porous material, and the cathode 16 may be a cathode that has an oxidoreductase and an electron mediator immobilized onto the surface of an electrode formed of a conductive porous material. Here, the surface of an electrode includes the entire external surface of the electrode and the entire internal surface inside the porous structure, and this also applies to the later described cases.

At the anode 14 in this structure, the fuel is broken down by the enzyme immobilized onto the surface, so that electrons are extracted, and proton ($H^+$) is generated. The anode 14 and the cathode 16 are connected to a current collector 17, for example. At the cathode 16, water is generated from the proton transferred from the anode 14 via the protonic conductor 15, the electrons transferred from the anode 14 through the current collector 17, and oxygen in the air, for example.

As the conductive porous material forming the anode 14, a known material can be used, but it is particularly preferable to use a carbon-based material, such as porous carbon, carbon pellet, carbon felt, carbon paper, carbon fiber, or a stack structure of carbon fine particles. As the enzyme to be immobilized onto the surface of the anode 14, glucose dehydrogenase (GDH), which breaks down glucose, can be used, if the fuel is glucose.

In a case where a monosaccharide such as glucose is used as the fuel, a coenzyme oxidase and an electron mediator, as well as an oxidase such as GDH that facilitates oxidation of a monosaccharide and breaks down the monosaccharide, are preferably immobilized onto the surface of the anode 14. A coenzyme oxidase oxidizes a coenzyme (such as $NAD^+$ or $NADP^+$) that is reduced with an oxidase, and a coenzyme reductant (such as NADH or NADPH). Such a coenzyme oxidase may be diaphorase, for example. By virtue of the action of the coenzyme oxidase, electrons are generated when a coenzyme returns to an oxidant, and the electrons are transferred from the coenzyme oxidase to the electrode via an electron mediator.

As the electron mediator, a compound having a quinone skeleton is preferably used, and a compound having a naphthoquinone skeleton is more preferable. Specifically, it is possible to use 2-amino-1,4-naphthoquinone (ANQ), 2-amino-3-methyl-1,4-naphthoquinone (AMNQ), 2-methyl-1,4-naphthoquinone (VK3), 2-amino-3-carboxy-1,4-naphthoquinone (ACNQ), or the like. As the compound having a quinone skeleton, it is possible to use anthraquinone or a derivative thereof, other than a compound having a naphthoquinone skeleton. Further, one or more compounds that function as electron mediators can be immobilized together with a compound having a quinone skeleton, where necessary.

In a case where a monosaccharide is used as the fuel, it is preferable to immobilize a degrading enzyme that facilitates degradation such as hydrolytic degradation of a polysaccharide to generate a monosaccharide such as glucose, as well as the above mentioned oxidase, coenzyme oxidase, coenzyme, and electron mediator. It should be noted that a "polysaccharide" used herein is in a broad sense, and indicates all kinds of carbohydrates that generate two or more molecules of monosaccharides through hydrolytic degradation, including oligosaccharides such as disaccharides, trisaccharides, and tetrasaccharides. Specific examples include starch, amylose, amylopectin, glycogen, cellulose, maltose, sucrose, and lactose. Each of those examples is formed by two or more monosaccharides binding together, and any of those polysaccharides contains glucose as the monosaccharide serving as the binding unit.

Amylose and amylopectin are components contained in starch, and starch is a mixture of amylose and amylopectin. In a case where glucoamylase is used as a polysaccharide-degrading enzyme, and glucose dehydrogenase is used as a monosaccharide-degrading oxidase, for example, a polysaccharide that can be broken down into glucose by glucoamylase can be used as the fuel. Examples of such polysaccharides include starch, amylose, amylopectin, glycogen, and maltose. Here, glucoamylase is a degrading enzyme that hydrolytically degrades α-glucan such as starch to generate glucose, and glucose dehydrogenase is an oxidase that oxides β-D-glucose into D-glucono-δ-lactone.

As the conductive porous material forming the cathode 16, a known material can also be used, but it is particularly preferable to use a carbon-based material, such as porous carbon, carbon pellet, carbon felt, carbon paper, carbon fiber, or a stack structure of carbon fine particles. Examples of enzymes that can be immobilized onto the cathode 16 include oxygen reduction enzymes, such as bilirubin oxidase, laccase, and ascorbic acid oxidase. Examples of electron mediators that can be immobilized together with those enzymes include potassium hexacyanoferrate, potassium ferricyanide, and potassium octacyanotungstate.

Further, the protonic conductor 15 is made of a material that does not have electron conductivity but can transfer proton ($H^+$). Examples of such materials include cellophane, gelatin, and an ion-exchange resin containing a fluorine-containing carbon sulfonate group. Alternatively, an electrolyte can be used as the protonic conductor.

The battery cell unit 30 may be of an immersion type that has both the anode 14 and the cathode 16 immersed in the fuel solution, or may be of an atmosphere exposure type that has only the anode 14 in contact with the fuel solution 50 and has the cathode 16 exposed to the atmosphere.

Each electrode provided in the battery cell unit 30 is not limited to an electrode having an oxidoreductase immobilized to the surface thereof, but may be an electrode that has an oxidoreductase on the electrode surface thereof. Specifically, it is possible to use electrodes that have microorganisms with oxidoreductases attached to the surfaces, and cause the above-described actions at the anode 14 and the cathode 16.

[Fuel Solution 50]

The fuel solution 50 used in the present invention is not particularly limited. The fuel solution 50 is an aqueous solution containing a "sugar" that serves as the fuel. In addition to the fuel and water, an additive agent such as a flavoring agent, a coloring agent, a preserving agent, or a dispersing agent may be added, and a commercially available beverage that is not specially blended can also be used. More specifically, it is possible to use soft drinks, sugar water, alcohol drinks, and the like, which can be consumed by humans. The container 1 that contains the fuel solution 50 is not particularly limited either, and a widely-used bottle (such as a polyethylene terephthalate bottle (PET bottle) or a glass bottle) can be used. Accordingly, a commercially available bottled beverage can be used as it is.

[Operations]

Figure 3:
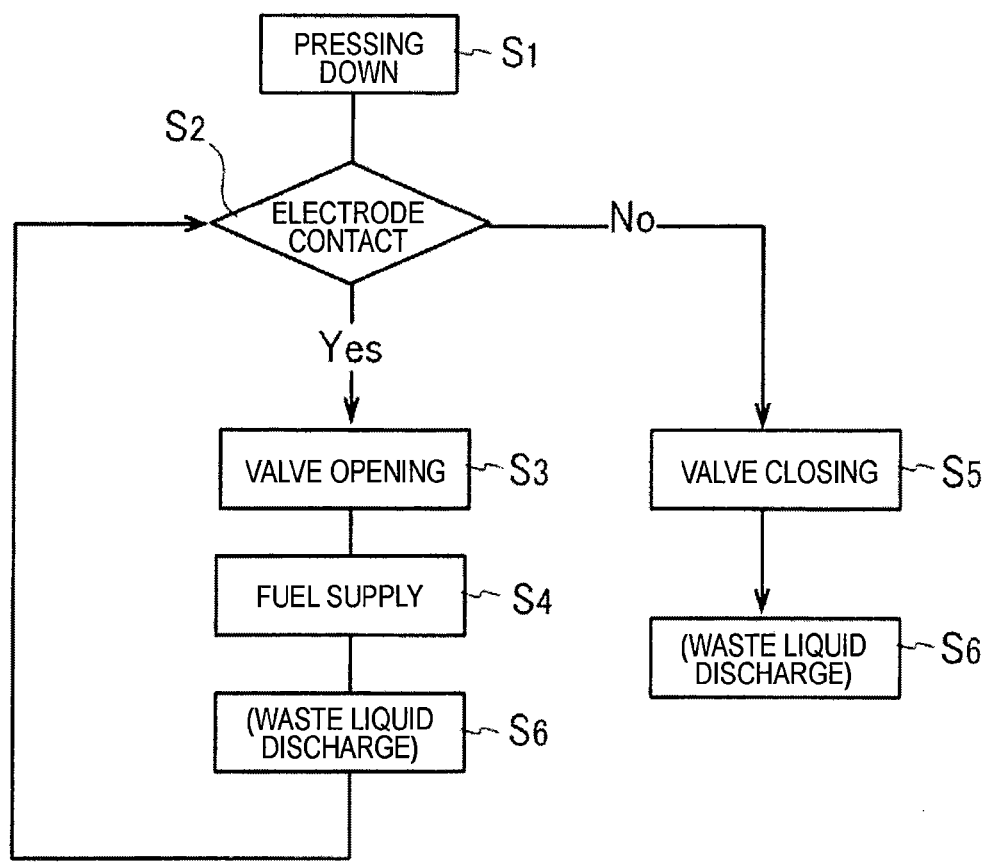
FIG. 3 is a flowchart for explaining the procedures of power generation using the fuel leakage preventing structure according to the first embodiment of the present invention.

Next, an example of usage of the fuel leakage preventing structure is described. FIG. 3 is a flowchart showing the procedures to be carried out in the example of usage.

(1) Pressing Down

In FIG. 3, "pressing down" denoted by $S_1$ is the step of attaching the container 1 to the fuel leakage preventing structure and applying a pressing force to the first member 2a. In the first embodiment, the attachment opening of the fuel supply unit 6 is made to face downward, and the opening portion of the container 1 is inserted into the attachment opening from below. In this manner, the container 1 is attached to the fuel leakage preventing structure. As electrode contacting $S_2$ occurs by virtue of the pressing force applied to the first member 2a, the control valve 7 is opened at $S_3$.

(2) Fuel Supply

In FIG. 3, "fuel supply" denoted by $S_4$ is the step of supplying the fuel solution 50 in the container 1 to the primary storage unit 8 and the secondary storage unit 13. After the attachment of the container 1, the positions of the fuel leakage preventing structure and the battery cell unit 30 are turned upside down, and the opening of the container 1 is made to face downward. As a result, the fuel solution 50 contained in the container 1 flows into the fuel supply unit 6.

When the control valve 7 is opened at $S_3$, the fuel solution 50 is supplied from the fuel supply unit 6 to the primary storage unit 8, as shown in FIG. 1B. The time to open the control valve 7 at $S_3$ may be before or after the positions of the fuel leakage preventing structure and the battery cell unit 30 are turned upside down.

In a case where the sub control valve 11 is provided between the primary storage unit 8 and the secondary storage unit 13, the control device 4 opens the sub control valve 11 when the liquid volume in the primary storage unit 8 reaches a predetermined maximum liquid volume. When opening the sub control valve 11, the control device 4 closes the control valve 7 even if the first and second electrodes 3a and 3b are in a conducting state, so as to prevent an oversupply of the fuel solution 50 from the fuel supply unit 6 to the primary storage unit 8.

FIG. 2 shows a situation where the fuel solution 50 is supplied to the secondary storage unit 13, and the fuel solution 50 is brought into contact with an electrode (the anode 14) of the battery cell unit 30, to start power generation. During the power generation, the supply of the fuel solution 50 to the secondary storage unit 13 may be continued, but the liquid volume in the secondary storage unit 13 is preferably controlled. For example, when the liquid volume in the secondary storage unit 13 reaches a predetermined maximum liquid volume, the sub control valve 11 is closed, to prevent an oversupply of the fuel solution 50 from the primary storage unit 8 to the secondary storage unit 13.

The control valve 7 and the sub control valve 11 may be closed, and the power generation may be continued until the fuel (sugar) in the fuel solution 50 is completely consumed. Also, the control valve 7 and the sub control valve 11 may be opened, to replenish the battery cell unit 30 with the fuel solution 50 and continue the power generation.

(3) Waste Liquid Discharge

In FIG. 3, "waste liquid discharge" denoted by $S_6$ is the step of discharging the fuel solution 50 (a waste liquid) from the battery cell unit 30 after the use in the power generation.

Through the power generation, not only the sugar in the fuel solution 50 is consumed, but also a degradation product such as a lactone and water are generated. Therefore, if long-time power generation is necessary, the power generation efficiency becomes lower unless the fuel solution 50 is exchanged. Also, if the fuel solution (a waste liquid) is left in the battery cell unit 30 after the power generation, the anode 14 and the cathode 16 might be damaged. Therefore, the step of discharging the waste liquid is required during and/or after the power generation.

In a case where the waste liquid is discharged during the power generation, the waste liquid discharge valve 12 is opened by hand or by the control device 4. The timing to open the waste liquid discharge valve 12 is not particularly limited. The waste liquid discharge valve 12 may be opened after a predetermined period of time has passed since the power generation start, or may be opened when the output from the biofuel cell becomes lower.

When the waste liquid discharge valve 12 is opened during the power generation, the control valve 7 and the sub control valve 11 are preferably opened by hand or by the control device 4, to further supply the fuel solution 50. For example, the control device 4 is designed to open the control valve 7 and the sub control valve 11 when the liquid volume in the primary storage unit 8 or the secondary storage unit 13 becomes smaller than a predetermined minimum liquid volume due to discharge of a waste liquid.

In a case where a waste liquid is discharged after power generation is ended, the waste liquid discharge valve 12 is preferably opened while at least one of the control valve 7 and the control valve 11 is closed, so as to prevent the waste liquid from flowing into the fuel supply unit 6 and the container 1.

When the fuel solution 50 valid for power generation disappears from the inside of the biofuel cell due to a stop of the supply of the fuel solution 50 to the battery cell unit 30 and/or discharge of the fuel solution 50 from the battery cell unit 30, the power generation is ended. After the end of the power generation, the container 1 is detached from the fuel leakage preventing structure. As a result, the pressing force applied to the first member 2a is lost, and the electrode contacting $S_2$ is cancelled in a non-conducting state. Regardless of signals from the sensors 10 and 18, the control device 4 closes the control valve 7 at $S_5$ when the first and second electrodes 3a and 3b are in a non-conducting state. Accordingly, after the end of the power generation, the battery cell unit 30 is shielded from the outside atmosphere.

The container 1 is detached after the positions of the fuel leakage preventing structure and the battery cell unit 30 are turned upside down to make the opening of the container 1 face upward. Accordingly, the fuel solution 50 is not spilled. Also, at least one of the control valve 7 and the sub control valve 11 is closed before the opening of the container 1 is made to face upward, so that the waste liquid does not enter the container 1.

In the fuel leakage preventing structure of this embodiment, the control valve 7 is opened and closed by a pressing force generated by attaching and detaching the container 1. Accordingly, the fuel solution 50 is easily supplied to the battery cell unit 30, and liquid leakage does not occur. When the container 1 is not attached and not used, the control valve 7 is closed. Accordingly, the inside of the battery cell unit 30 does not become dry, and an increase in the viscosity of the fuel solution 50 or the like and a decrease in the speed of fuel supply to the surface and inside of an electrode due to such an increase in the viscosity can be prevented. Contamination by foreign matter (such as microorganisms, insects, and dust) is also prevented, and accordingly, the power generation efficiency of the battery cell unit 30 does not become lower.

<1b. Modification of the First Embodiment≤

Although a case where the first member 2a is pressed down directly by the container 1 has been described above, the present invention is not limited to that.

Figure 4:
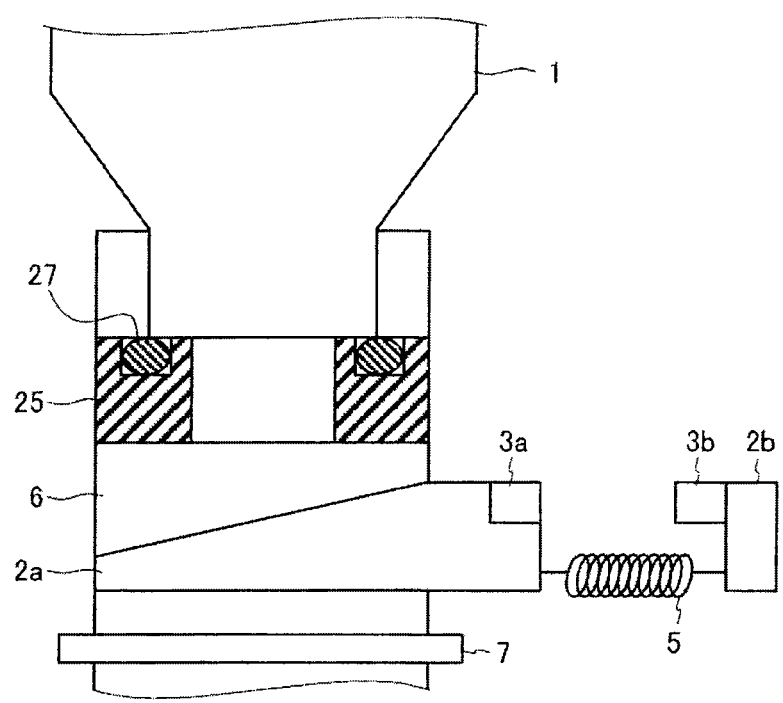
FIG. 4 is a partial cross-sectional view schematically showing a modification of the fuel leakage preventing structure according to the first embodiment of the present invention.

FIG. 4 shows a modification of the first embodiment, and a moving member 25 that can move in the upward direction (the direction toward the attachment opening) and the downward direction (the direction away from the attachment opening) is provided in the path of the fuel supply unit 6.

The moving member 25 is located between the attachment opening of the fuel supply unit 6 and the first member 2a. When the opening portion of the container 1 is inserted into the attachment opening, the top end of the opening portion is pressed against the moving member 25. When pressed down by the contained 1, the moving member 25 is moved downward, and is pushed against the first member 2a. As a result, the first member 2a is pressed down.

Accordingly, in this modification, the pressing down $S_1$ of the first member 2a is performed via the moving member 25. As the first member 2a is moved by the pressing down, the electrode contacting $S_2$ occurs, and the control valve 7 is then opened at $S_3$.

The shape of the moving member 25 is not particularly limited, and may be a ring-like shape, for example, forming a path to face the opening of the container 1. Accordingly, even when the top end of the opening portion of the container 1 is pressed against the moving member 25, the fuel solution 50 can be supplied from the container 1 to the fuel supply unit 6 through the path of the moving member 25.

A liquid leakage preventing O-ring 27 is provided at the portion of the moving member 25 to be in contact with the top end of the opening portion of the container 1, so as to surround the path of the moving member 25. With this arrangement, leakage of the fuel solution 50 from a space between the container 1 and the moving member 25 can be prevented.

In the first embodiment illustrated in FIGS. 1A, 1B, and 2, the attachment opening of the fuel supply unit 6 needs to be made as small as possible in conformity with the container 1, so as to prevent liquid leakage from a space between the fuel supply unit 6 and the container 1.

In this modification, the attachment opening of the fuel supply unit 6 can be made so large that a large-sized container 1 can be attached thereto. In that case, when a small-sized container 1 is attached, a space is formed between the fuel supply unit 6 and the container 1. However, the top end of the opening portion of the container 1 is in tight contact with the moving member 25 (or with the liquid leakage preventing O-ring 27), so as to prevent leakage of the fuel solution 50. Accordingly, containers 1 of various sizes and shapes can be used.

Although a case where the first member 2a is pressed down by a container 1 has been described above, the present invention is not limited to that. In the following, an embodiment in which the first member 2a is pressed down by a component other than a container 1 is described.

<2a. Second Embodiment>

Figure 5A:
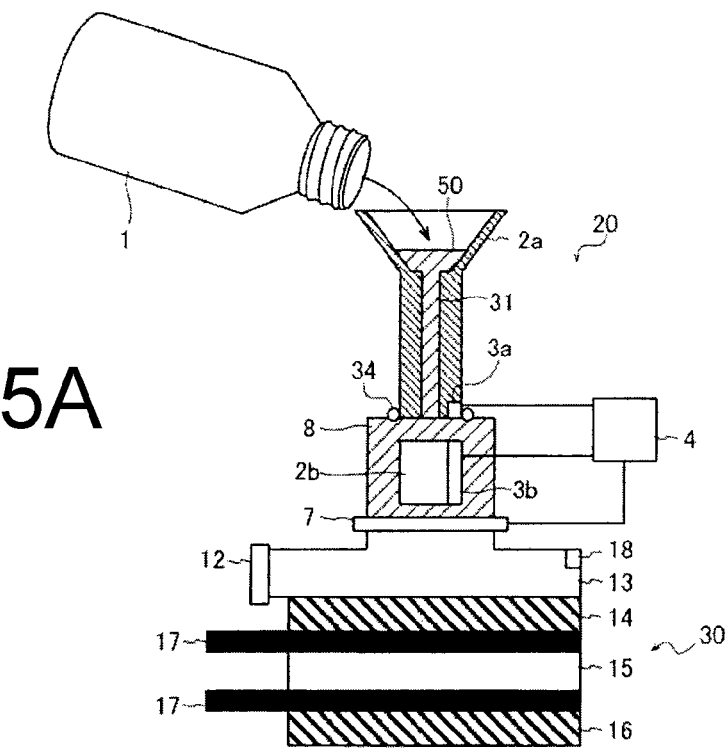
FIG. 5A is a cross-sectional view schematically showing a situation where a fuel solution has been supplied into a primary storage unit in a fuel leakage preventing structure according to a second embodiment of the present invention.
Figure 5B:
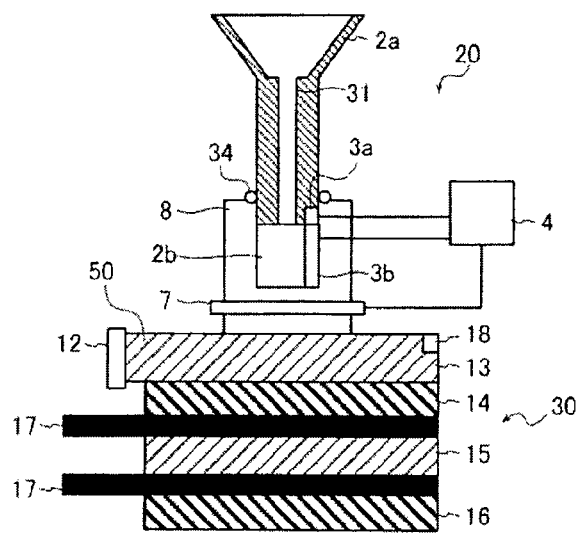
FIG. 5B is a cross-sectional view schematically showing a situation where a fuel solution has been supplied into a secondary storage unit.

FIGS. 5A and 5B are cross-sectional views schematically showing a fuel leakage preventing structure of a second embodiment of the present invention. In the drawings, the same components as those of the first embodiment are denoted by the same reference numerals used in the first embodiment.

A first member 2a is in a stick-like form. One end (the lower end) of the first member 2a is inserted into a primary storage unit 8, and the other end (the upper end) is exposed to the outside of the primary storage unit 8. In this embodiment, a path (a fuel introducing portion 31) of a fuel solution 50 is provided inside the first member 2a.

Although not particularly limited, the fuel introducing portion 31 is a through hole that penetrates through the first member 2a from the upper end to the lower end, for example. That is, the fuel introducing portion 31 is a path connecting the internal space of the primary storage unit 8 to the external space, and the fuel solution 50 is introduced into the primary storage unit 8 through the fuel introducing portion 31.

The shapes of the first member 2a and the fuel introducing portion 31 are not particularly limited. However, if the first member 2a is formed into a funnel shape so that the upper end portion of the fuel introducing portion 31 has a larger diameter, introduction of the fuel solution 50 becomes even easier.

In this embodiment, the first member 2a is not fixed either, and can be moved up and down, for example. A second member 2b is provided inside the primary storage unit 8, and a second electrode 3b is located immediately below a first electrode 3a. Accordingly, the first and second electrodes 3a and 3b move away from each other when the first member 2a is moved upward, and the first and second electrodes 3a and 3b move toward each other when the first member 2b is moved downward.

That is, the first member 2a moves in such a direction that the first and second electrodes 3a and 3b move away from or toward each other, and the movement of the first member 2a causes the electrode contacting $S_2$ (FIG. 5B) or cancels the electrode contacting $S_2$ (FIG. 5A). That is, the conducting state between the first and second electrodes 3a and 3b varies, depending on movement of the first member 2a.

In this embodiment, a control device 4 also opens and closes a control valve 7, depending on variations of the conducting state between the first and second electrodes 3a and 3b. The control valve 7 is a gate valve that separates the primary storage unit 8 and the secondary storage unit 13 from each other, for example. When the control valve 7 is opened at $S_3$, the primary storage unit 8 is connected to the secondary storage unit 13.

The second member 2b is positioned to face the fuel introducing portion 31, and the end portion of the fuel introducing portion 31 is blocked by the second member 2b at the time of the electrode contacting $S_2$. With this arrangement, the first member 2a also functions as a gate valve that shields/connects the primary storage unit 8 from/to the external space.

The first member 2a moves in and out of the primary storage unit 8. Therefore, to prevent liquid leakage, a liquid leakage preventing O-ring 34 or the like is preferably provided at the insertion portion of the primary storage unit 8 into which the first member 2a is inserted.

In this embodiment, a battery cell unit 30 and other structures are not particularly limited, and may be the same as or differ from those shown in FIG. 1A, 1B, or 2.

The second member 2b may be located outside the primary storage unit 8. For example, the second member 2b may be located above the first member 2a. In such a case, when the first member 2a is pushed into the primary storage unit 8, the first member 2a is separated from the second member 2b, and the electrode contacting $S_2$ is canceled. When the first member 2a is pulled up from the primary storage unit 8, the first member 2a moves closer to the second member 2b, and the electrode contacting $S_2$ occurs. In short, the second embodiment is to open and close the control valve 7, depending on the change in pressing force between an operation to press down the first member 2a (Push) and an operation to pull up the first member 2a (Pull).

[Operations]

Next, an example of usage of the fuel leakage preventing structure according to the second embodiment is described.

(1) Pressing Down

In this embodiment, a user pushes the first member 2a, to generate a pressing force. In this case, the electrode contacting $S_2$ also occurs by virtue of the pressing down $S_1$, and the control valve 7 is opened at $S_3$. In a case where the fuel introducing portion 31 is blocked by the second member 2b at the time of the electrode contacting $S_2$, the fuel solution 50 is injected into the fuel introducing portion 31, and the fuel solution 50 is supplied to the primary storage unit 8 prior to the electrode contacting $S_2$.

(2) Fuel Supply

When the control valve 7 is opened at $S_3$ by the electrode contacting $S_2$, the fuel solution 50 in the primary storage unit 8 is supplied to the secondary storage unit 13, to start power generation. If the fuel introducing portion 31 is blocked by the second member 2b at this point, the fuel solution 50 is not oversupplied to the secondary storage unit 13, and foreign matter can be prevented from entering from outside.

A sensor 18 transmits a signal indicating the liquid volume in the secondary storage unit 13 to the control device 4. When the liquid volume in the secondary storage unit 13 reaches a predetermined maximum liquid volume, the control device 4 closes the control valve 7 even if the first and second electrodes 3a and 3b are in a conducting state.

(3) Waste Liquid Discharge

In this embodiment, the waste liquid discharge $S_6$ can also be performed during and/or after power generation, as in the first embodiment.

The waste liquid discharge $S_6$ is performed by the waste liquid discharge valve 12 provided on one or both of the primary storage unit 8 and the secondary storage unit 13. In the following, a case where the waste liquid discharge valve 12 is provided on the secondary storage unit 13 is described.

In a case where the waste liquid discharge $S_6$ is performed during power generation, the waste liquid discharge valve 12 is opened while the control valve 7 is closed, and a waste liquid is then discharged. Even in the state of the electrode contacting $S_2$, the control device 4 keeps the control valve 7 closed when the liquid volume in the secondary storage unit 13 is equal to or larger than a predetermined minimum liquid volume. However, when the liquid volume is smaller than the minimum liquid volume and the electrodes are in the state of the electrode contacting $S_2$, the control device 4 opens the control valve 7.

If the fuel solution 50 is supplied to the primary storage unit 8 in advance, the fuel solution 50 is newly supplied to the secondary storage unit 13 when the control valve 7 is opened. Accordingly, power generation is continued without an intermission.

In a case where a waste liquid is discharged after power generation is ended, the waste liquid is discharged after the control valve 7 is closed and the fuel introducing portion 31 is blocked. Accordingly, the waste liquid does not enter the fuel supply unit 3.

<2b. Modification of the Second Embodiment>

Figure 6A:
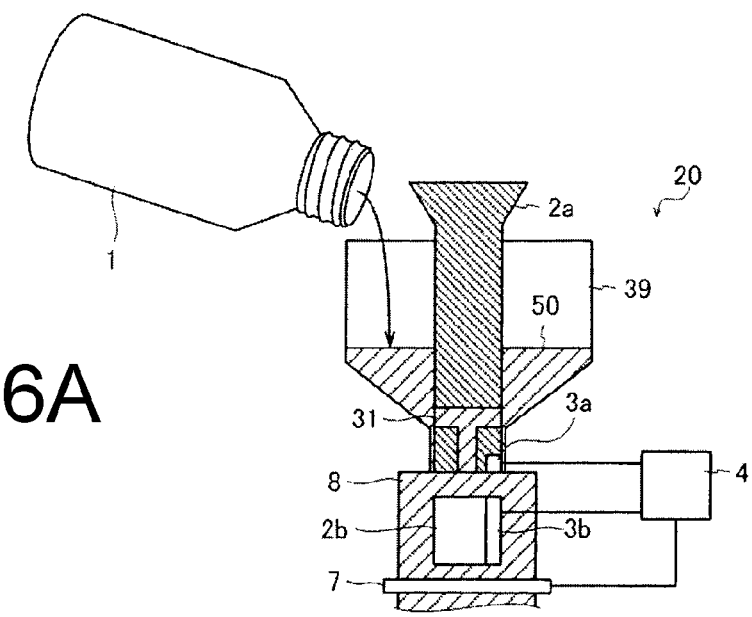
FIG. 6A is a cross-sectional view schematically showing a situation where the first member has been lifted up in a modification of the fuel leakage preventing structure according to the second embodiment of the present invention.
Figure 6B:
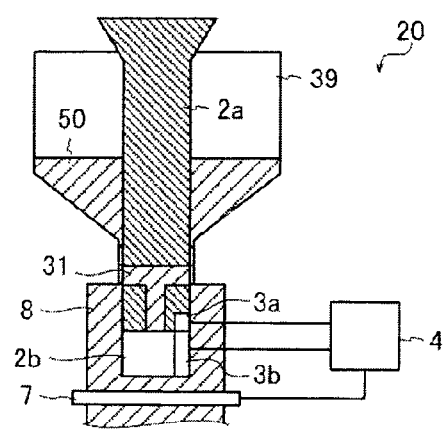
FIG. 6B is a cross-sectional view schematically showing a situation where the first member has been pushed down.
Figure 7A:
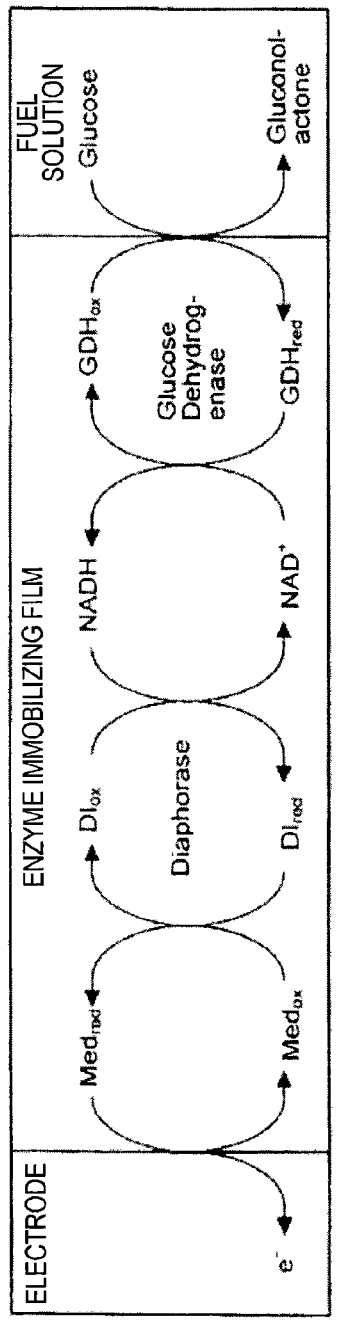
FIG. 7A is a diagram showing a reaction scheme of the anode of a biofuel cell.
Figure 7B:
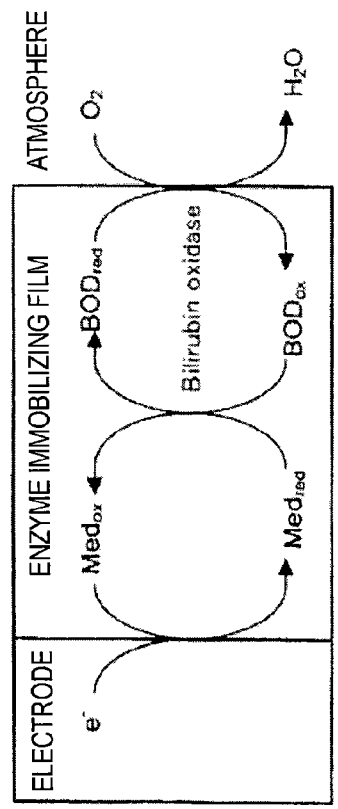
FIG. 7B is a diagram showing a reaction scheme of the cathode of the biofuel cell.

Although a case where the fuel solution 50 is injected directly into the fuel introducing portion 31 of the first member 2a has been described above, the present invention is not limited to that. FIGS. 6A and 6B illustrate a modification of the second embodiment of the present invention.

In this modification, an introducing member 39 for the fuel solution 50 is attached to the primary storage unit 8. The shape of the introducing member 39 is not particularly limited. For example, the introducing member 39 has a hopper shape (a funnel shape) that has a larger diameter at the upper end and a smaller diameter at the lower end. The lower end is inserted into the primary storage unit 8, and the upper end is open to the external space. The fuel solution 50 is poured into the upper end from the container 1.

The first member 2a is inserted through the introducing member 39. When the fuel solution 50 is poured into the introducing member 39, the fuel solution 50 is supplied to the region surrounding the first member 2a. The fuel solution 50 is supplied to the primary storage unit 8 through the space between the first member 2a and the introducing member 39 or through the fuel introducing portion 31 formed in the first member 2a.

Specifically, the fuel introducing portion 31 is a bent through hole that extends from side surfaces of the first member 2a to the lower end of the first member 2a, and the fuel solution 50 stored in the region surrounding the first member 2a is supplied to the primary storage unit 8 through the fuel introducing portion 31.

In this modification, the first member 2a can also be moved up and down. The first member 2a is pressed down and pulled up to move up and down inside the introducing member 39, so that the conducting state between the first and second electrodes 3a and 3b varies.

REFERENCE SIGNS LIST

1 Container
2a, 2b First and second members
3a, 3b First and second electrodes
4 Control device
5 Pushing member
6 Fuel supply unit
7 Control valve
8 Primary storage unit
9, 27, 34 Liquid leakage preventing O-rings
11 Sub control valve
12 Waste liquid discharge valve
13 Secondary storage unit
14 Anode
15 Protonic conductor
16 Cathode
17 Current collector
10, 18 Sensors
20 Valve control unit
25 Moving member
30 Battery cell unit
31 Fuel introducing portion
39 Introducing member
50 Fuel solution

The invention claimed is:

1. A fuel leakage preventing structure for a biofuel cell, comprising:
a control valve attached to a fuel supply unit through which a fuel solution is introduced into a battery cell unit of the biofuel cell; and
a valve control unit configured to electrically control opening and/or closing of the control valve, wherein the valve control unit comprises:
a first electrode formed on a first member, and
a second electrode facing the first electrode formed on a second member,
wherein the valve control unit opens and/or closes the control valve, depending on conduction between the first electrode and the second electrode caused by a pressing force applied on the first member.

2. The fuel leakage preventing structure according to claim 1, wherein when the pressing force is applied to the first member, the first member is moved towards the second member, and the first electrode and the second electrode are brought into contact with each other, to cause the conduction between the first electrode and the second electrode.

3. The fuel leakage preventing structure according to claim 1, wherein a pushing member is provided between the first and second members, to apply a pushing force to separate the first member from the second member.

4. The fuel leakage preventing structure according to claim 1, wherein
one end of the fuel supply unit serves as an attachment opening for a container containing the fuel solution, wherein
the first member is located below the attachment opening, and the second member is located on a side of the first member, wherein
a surface of the first member facing the attachment opening is tilted, and wherein the tilted surface is closer to the attachment opening at a first portion closer to the second member, and is farther from the attachment opening at a second portion farther from the second member.

5. The fuel leakage preventing structure according to claim 1, wherein the valve control unit further comprises a primary storage unit to store the fuel solution, wherein
the first member is inserted into the primary storage unit, and the second electrode is positioned at a location inside the primary storage unit facing the first electrode, and wherein
the first member is movable in a direction in which the first and second electrodes move closer to each other, and in a direction in which the first and second electrodes move away from each other.

6. The fuel leakage preventing structure according to claim 5, wherein a fuel introducing portion serving as a path of the fuel solution is formed in the first member.

7. A biofuel cell comprising:
a battery cell unit including an electrode with an enzyme existing on a surface thereof; and
a fuel leakage preventing structure configured to supply a fuel solution to the battery cell unit, wherein the fuel leakage preventing structure includes:
a control valve; and
a valve control unit configured to electrically control opening and/or closing of the control valve, wherein the valve control unit comprises:
a first electrode formed on a first member, and
a second electrode facing the first electrode formed on a second member,
wherein the control valve is attached to at least one of a fuel supply inlet through which the fuel solution is introduced into the battery cell unit, and a fuel supply path connected to the fuel supply inlet, and the valve control unit opens and/or closes the control valve, depending on conduction between the first electrode and the second electrode caused by a pressing force applied on the first member.

8. The fuel leakage preventing structure according to claim 1, wherein when a container containing the fuel solution is inserted into an attachment opening of the fuel supply unit, end of an opening portion of the container reaches a tilted surface of the first member, and wherein the pressing force is applied on the tilted surface of the first member by the container.

9. The fuel leakage preventing structure according to claim 1, wherein the control vale unit further comprises a sensor that transmits a signal indicating a volume of liquid in a storage unit that stores the fuel solution.

10. The fuel leakage preventing structure according to claim 9, wherein the valve control unit opens and/or closes the control valve based on the signal received from the sensor.

\* \* \* \* \*